US012665513B2

(12) United States Patent
Avestruz et al.

(10) Patent No.: US 12,665,513 B2
(45) Date of Patent: Jun. 23, 2026

(54) POWER CONVERTER FREQUENCY CONTROL

(71) Applicant: The Regents of the University of Michigan, Ann Arbor, MI (US)

(72) Inventors: Al-Thaddeus Avestruz, Ann Arbor, MI (US); Xiaofan Cui, Ann Arbor, MI (US); Veronica Contreras, Ann Arbor, MI (US); Wentao Xu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 266 days.

(21) Appl. No.: 18/211,448

(22) Filed: Jun. 19, 2023

(65) Prior Publication Data

US 2023/0412061 A1 Dec. 21, 2023

Related U.S. Application Data

(60) Provisional application No. 63/353,325, filed on Jun. 17, 2022.

(51) Int. Cl.
H02M 3/158 (2006.01)
H02M 1/00 (2006.01)
(52) U.S. Cl.
CPC ....... H02M 3/1584 (2013.01); H02M 1/0025 (2021.05)
(58) Field of Classification Search
CPC . H02M 3/1584; H02M 3/1566; H02M 3/1586
See application file for complete search history.

(56) References Cited

U.S. PATENT DOCUMENTS

| | | | |
|---|---|---|---|
| 2011/0199797 A1* | 8/2011 | Bridge | H02M 3/1584 363/65 |
| 2014/0152278 A1* | 6/2014 | Shepard | H02M 3/1584 323/272 |
| 2019/0052169 A1* | 2/2019 | Bhandarkar | H02M 1/4225 |

OTHER PUBLICATIONS

B. Halivni et al.; Digital Controller for High-Performance Multiphase VRM with Current Balancing and Near-Ideal Transient Response; 2020 IEEE Applied Power Electronics Conference and Exposition (APEC); 2020; pp. 2206-2213.
Cui, Xiaofan, et al.; High-Speed Digital Control in a Switching-Synchronized Sampled-State Space for Variable Frequency Multi-Phase Buck Converters; 2022 IEEE 23rd Workshop on Control and Modeling for Power Electronics (COMPEL); 2022; pp. 1-9.
E. R. Magsino; Employing Sliding Mode Control on a Two-Phase Voltage Regulator Module; 2021 2nd International Conference for Emerging Technology (INCET); 2021; pp. 1—abstract.
(Continued)

*Primary Examiner* — Alex Torres-Rivera
(74) *Attorney, Agent, or Firm* — Lempia Summerfield Katz LLC

(57) ABSTRACT

A power converter device includes power converter circuitry that includes multiple inductors. The power converter circuitry may convert an input voltage and current to an output voltage and current at a variable frequency via operation of the multiple inductors. The power converter device further includes control circuitry configured to implement cycle-by-cycle current output analysis to synchronize the multiple inductors to a particular current output characteristic of a first one of the multiple inductors.

15 Claims, 7 Drawing Sheets

(56) References Cited

OTHER PUBLICATIONS

S. Kapat; Sampling Delay Effect on Stability in a Multi-Phase Buck Converter using Digital Current Mode Control; 2021 IEEE Applied Power Electronics Conference and Exposition (APEC); 2021; pp. 523-527.

T. A. Denison; The development of a nanoscale Coulter counter for rapid genetic sequence recognition; Thesis (Ph.D.)—Massachusetts Institute of Technology, Dept. of Electrical Engineering and Computer Science, 2000; pp. 1-114.

T. Urkin et al.; Digital Multiphase PWM Integrated Module Generated from a Single Synchronization Source; 2021 IEEE Applied Power Electronics Conference and Exposition (APEC); 2021; pp. 1001-1007.

W.-C. Liu et al.; A Novel Ultrafast Transient Constant on-Time Buck Converter for Multiphase Operation; IEEE Transactions on Power Electronics; vol. 36, Nov. 2021; pp. 13096-13106.

X. Cui et al.; A new framework for cycle-by-cycle digital control of megahertz-range variable frequency buck converters; IEEE 19th Workshop on Control and Modeling for Power Electronics (COM-PEL), 2018, pp. 1-8.

T. A. Denison; The development of a nanoscale Coulter counter for rapid genetic sequence recognition; Thesis (Ph.D.)—Massachusetts Institute of Technology, Dept. of Electrical Engineering and Computer Science, 2000; pp. 115-247.

* cited by examiner

100

200

| Receive input voltage and current. | 202 |

Operate in accord with a particular output frequency.    204

Determine timing of an occurrence of a particular current characteristic in the output of the first inductor.    206

Cause generation of a current and voltage output.    208

400

Receive input command signal.                                          402

Combine command signal and correction signal.                          404

Monitor current output.                                                406

Provide output sensor signal to hourglass integrator for               408
cycle-by-cycle averaging.

Sample the cycle-by-cycle averaged signal.                             410

Generate a correction signal for provision to signal                   412
combiner.

POWER CONVERTER FREQUENCY CONTROL

PRIORITY

This application claims priority to U.S. Provisional Application No. 63/353,325, filed Jun. 17, 2022, and titled Power Converter Frequency Control, which is incorporated by reference herein in its entirety.

BACKGROUND

Technical Field

The disclosure relates generally to voltage control for variable frequency power converters.

Brief Description of Related Technology

Increasingly complex electronics have given rise to need for power conversion and other signal processing in various contexts. For example, devices including power supply circuitry may power components at various power levels and/or other input constraints. Accordingly, there is increasing demand for systems that efficiently and accurately process signals in variety of power and frequency environments. Improvements to signal processing technologies will continue to drive industrial demand.

DETAILED DESCRIPTION

In various contexts, an electrical system may use in-device power scaling, radio frequency (RF) signal amplification, DC-to-DC (direct-current-to-direct-current) conversion, phase-locked-loops, graphics processing unit (GPU)/central processing unit (CPU) power supply control, AC (alternating current) signal control, high-frequency current modes and/or other electrical signals. In various scenarios, control of output frequency and/or phase at high speeds may result in transient effects or other disturbances to the power converter output for these and/or other power converter applications.

Figure 1:
FIG. 1 shows an example power converter device.
Figure 1:
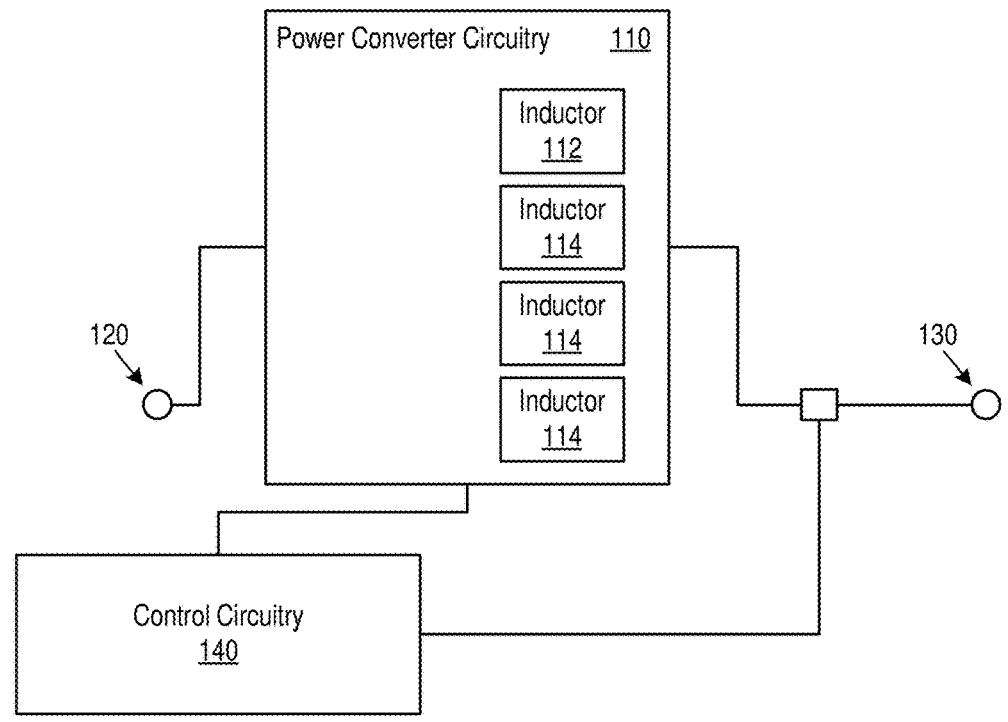

FIG. 1 shows an example power converter device 100. In the example power converter device, power converter circuitry 110 is controlled via control circuitry 140 to provide variable frequency control voltage and current output using cycle-by-cycle current control of the power converter circuitry. In various implementations, the power converter circuitry 110 may include multiple inductors 112, 114 which may be switched among phases (e.g., ramp-up, discharge, or other phases) based on switching signals.

The power converter circuitry may receive an input voltage and current at the input 120 and provide an output voltage and current at the output 130.

In various implementations, the control circuitry 140 may determine a specific timing point of an output current characteristic occurrence (e.g. a current peak, a current valley, a current zero crossing, or other current output characteristic) of a first inductor 112 of the multiple inductors and synchronize the other inductors 114 by determining relative delays for the occurrences of the characteristic among the other inductors 114. Accordingly, the other inductors may be synchronized to the switching frequency of the first inductor 112 (e.g., the "lead" inductor).

In various implementations, the current circuitry may provide cycle-by-cycle averaging of the current output of the power converter circuitry 110 to effect the control. Various cycle-by-cycle averaging schemes may be used. As an example, the hourglass integrator based cycle-by-cycle averaging control circuitry discussed below with respect to FIGS. 3 and 4 may be used.

In various implementations, various ones of the multiple inductors may be coupled to one another. For example, some amount of current flux may be shared by two or more inductors to couple their operation to one another.

Figure 2:
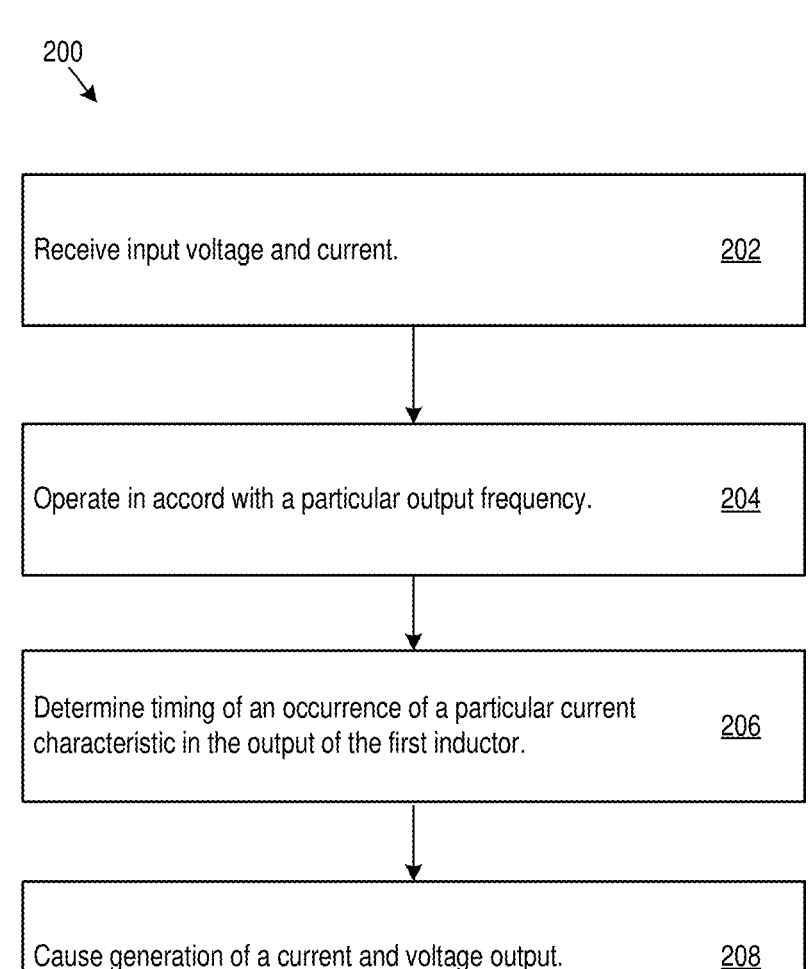
FIG. 2 shows example variable frequency power conversion logic.

Referring now to FIG. 2 while continuing to refer to FIG. 1, example variable frequency power conversion logic (VFPCL) 200 is shown. The example VFPCL 200 may be implemented as circuitry, which may include various integrator and/or timing circuits to perform cycle-by-cycle current control, and/or cycle-by-cycle current averaging. In some implementations, hardware circuitry may be used. In some implementations, software-based operations may be used in addition to hardware.

The VFPCL 200 may receive an input voltage and current (202) at the input 120. The VFPCL 200 may operate in accord with a particular output frequency (204). In some implementations, the output frequency may be determined based on the input frequency. For example, the output frequency may be the same as the input frequency, a multiple of the input frequency, or otherwise based on the input frequency. In some implementations, the output frequency may be selected independently of the input frequency. The particular output frequency may be controlled via a switching frequency used for the multiple inductors.

In some implementations, a first inductor 112 may be switched using a switching signal. for example, the switching signal may be derived from the input frequency and/or some portion of the input voltage and/or current. The switching signal may control when the first inductor 112 changes phases (e.g., ramp-up, discharge, or other phases). Operating in accord with a particular output frequency, may include the VFPCL 200 applying a switching signal to at least the first inductor 112, where the switching signal is tuned to the particular output frequency.

The VFPCL 200 may determine a timing of an occurrence of a particular current characteristic from the output of the first inductor 112 (206). For example, the VFPCL 200 may determine the timing position of a valley within the current output of the first inductor. In some cases, other characteristics may be used. For example, current peaks, inflection points in the output, and/or zero (or other reference/threshold level) crossings may be used.

Using the timing of the occurrence via the cycle-by-cycle current output analysis, the VFPCL 200 may synchronize the other inductors 114 to the first inductor 112 by applying a relative delay from the timing of the occurrence to a particular characteristic within the output of the individual ones of the other inductors. Various relative delay schemes may be used. For example, each of the individual ones of the other inductors 114 may be delayed directly based on its relative timing to the first inductor 112. In some implementations, cascaded timing may be used. For example, the inductors may be ordered in a relative sequence, such that the timing for each inductor is applied relative to a particular current feature for the previous inductor in the sequence. Regardless of whether the other inductors are delayed directly based on the timing of the first inductor or a cascaded timing scheme is used, the multiple inductors may be configured to switch in a particular sequence, e.g., one at a time from the first inductor 112 to a last inductor.

In some implementations, a particular characteristic of the output of an individual one or other inductors used for determining the delay relative to the characteristic of the output of the first inductor. This "follower" inductor output characteristic may be different from the characteristic of the output of the first inductor 112. For example, delay may be determined from a valley of the current output of the first inductor 112 to a peak in the current output of a given one of the other inductors 114. In some implementations, the same characteristic may be used. For example, delay may be determined from a valley of the current output of the first inductor 112 to a valley in the current output of the given one of the other inductors 114.

In some implementations, the switching signal for the follower inductors may be used to define relative delay. For example, the delay timing of switching signals may be adjusted while a correction signal from a cycle-by-cycle averaging analysis is driven towards a selected target. For example, an example correction signal may be driven towards zero such that the other inductors are properly synced when the correction signal is zero.

Figure 7:
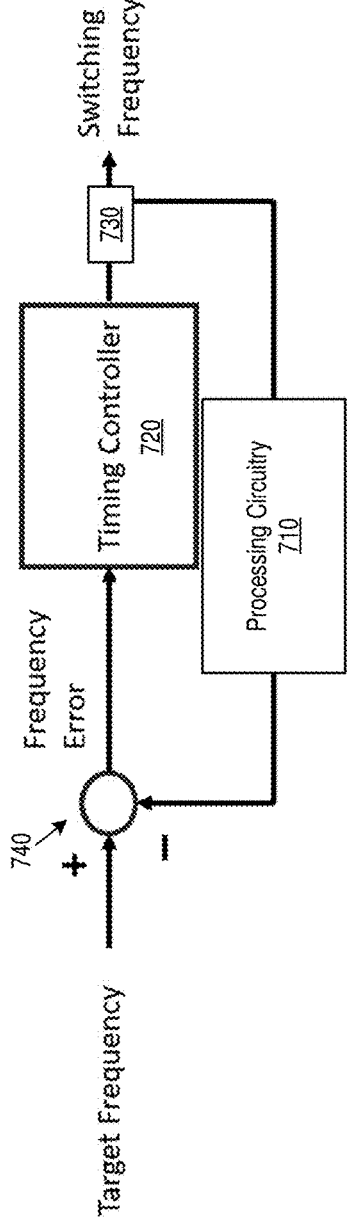
FIG. 7 shows example switching frequency control circuitry.

In some implementations, the switching frequency may be driven to a target steady-state switching frequency using feedback control. FIG. 7 shows example switching frequency control circuitry (SFCC) 700, which, for example, may be implemented as part of the control circuitry 140. The SFCC 700 may receive a signal from a sensor 730 at the output. The SFCC 700, e.g., via processing circuitry 710, may generate a frequency error signal. The timing controller 720 may adjust the frequency toward the target frequency until the error signal at the combiner 740 is zero. In various implementations, other feedback and/or control schemes may be used. The target frequency may be reached by the switching frequency after a delay.

The VFPCL 200 may cause generation of a current and voltage output (208). The output may have a transient period prior to a steady-state period. In some cases, the frequency of the output may be driven to the switching frequency of the first inductor 112 at steady-state operation. In some cases, this may occur as the other inductors 114 are synchronized to the first inductor 112. However, during the transient period, the instantaneous frequency of the output may be different from the switching frequency of the first inductor 112. In some cases, the VFPCL 200 may be tuned such that transient period is extended and/or convergence steady-state operation is delayed/prevented. Thus, the frequency of the output may be dynamically controlled by controlling the level of synchronization the inductors are allowed to reach. Additionally or alternatively, the frequency may be controlled with low noise and high-dynamic range power scaling by synchronizing multiple inductors to the steady-state frequency.

The length of the ramp-up time for the first inductor may be used to control the length of the transient period.

Figure 3:
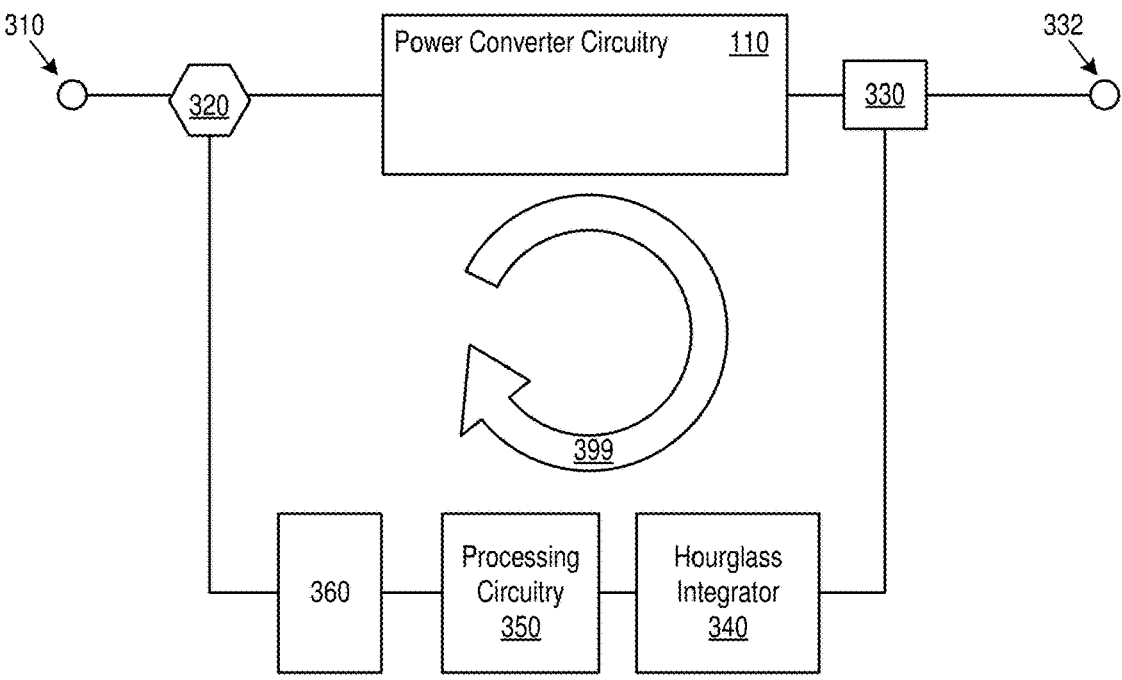
FIG. 3 shows example power converter control circuitry.

Referring now to FIG. 3, example power converter control circuitry 300 is shown. The example power converter control circuitry 300 may include an input command port 310 for an input command signal, a signal combiner 320 between input command port 310 and power converter circuitry 110. The power converter control circuitry 300 may further include a sensor 330 (such as a current or voltage sensor) that may monitor one or more outputs from the power converter circuitry 110. The sensor 330 for the output 332 may be coupled to an hourglass integrator 340. The hourglass integrator 340 may be coupled to an analog-to-digital converter (ADC) 350 and/or processing circuitry 360. The ADC 350/processing circuitry 360 may provide a correction signal to the signal combiner 320 for combination with the input control signal (e.g., in a feedback arrangement).

Figure 4:
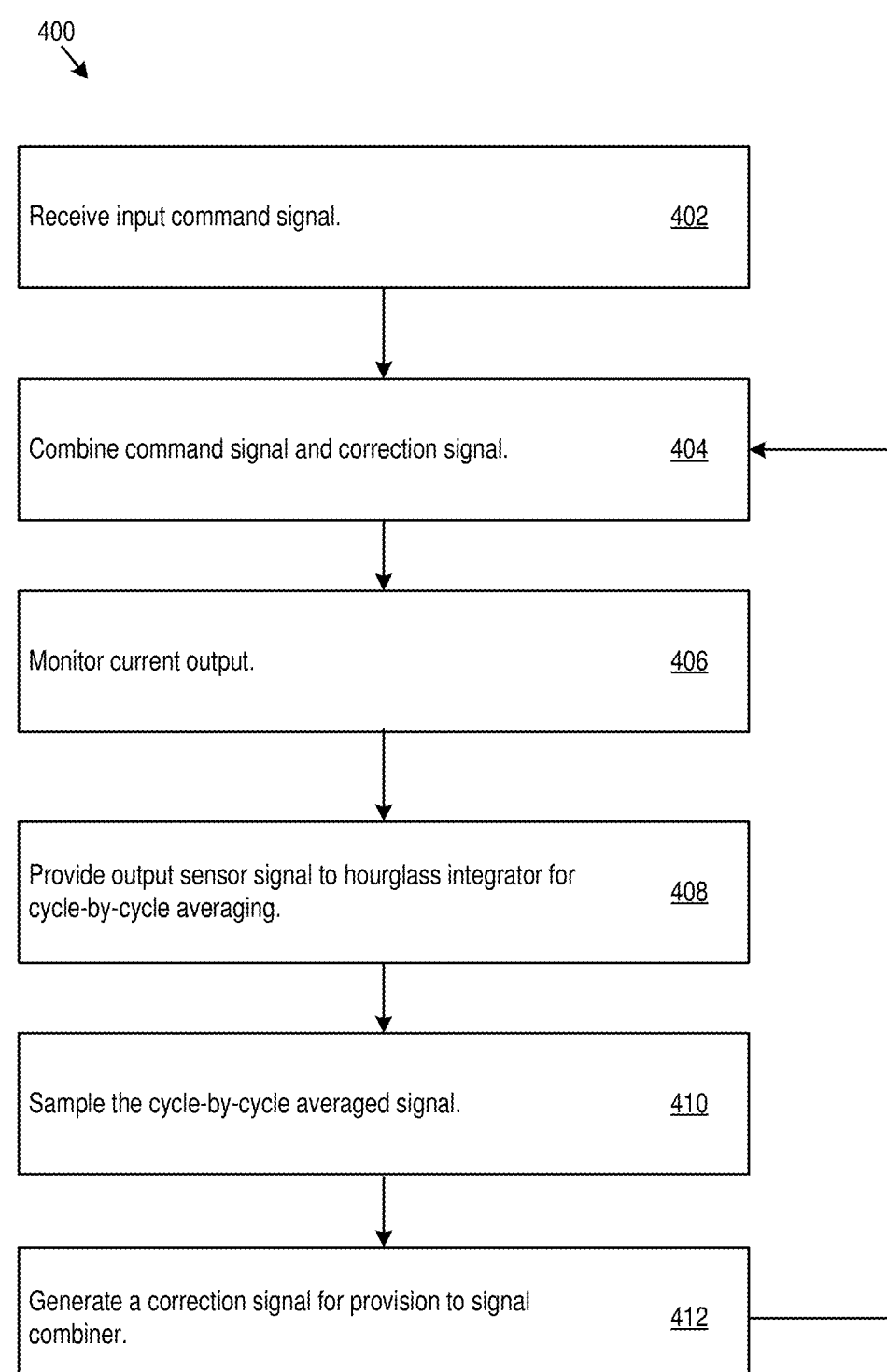
FIG. 4 shows example power conversion control logic.

Referring now to FIG. 4 while continuing to refer to FIG. 3, example power conversion control logic (PCCL) 400 is shown. The PCCL 400 may receive an input command signal at the input command port 310 (402). In various implementations, the input control signal may include a command signal for power converter circuitry 110, such as a switching signal for one or more inductors.

The PCCL 400 may combine the command signal with a correction signal at the signal combiner 320 (404) via the voltage control loop 399 configuration of the PCCL 400. In some implementations, the signal combiner 320 may include an adder circuit. However, in various implementations differential signal combination configurations or other signal combination configurations may be used.

The PCCL 400 may monitor, e.g., via the sensor 330 the current output of the power converter circuitry 110, an output sensor signal (406). In various implementations, the output sensor signal may be indicative of the current output of the power converter circuitry 110.

The PCCL 400 may provide the output sensor signal to the hourglass integrator 340 for cycle-by-cycle averaging of the output sensor signal (408). The hourglass integrator may be characterized by a time constant. The time constant of the integrator may be selected on different timescales throughout the system. For example, the time constant may be selected to accommodate time for a voltage ramp from a reference voltage (such as a ground, a zero voltage, a defined set reference voltage level for the system, or other reference voltage) to a full-scale voltage. Accordingly, a longest duration ramp may be accommodated by the time constant of the hourglass integrator.

The cycle-by-cycle averaged signal from the hourglass integrator 340 may be provided by the PCCL 400 to the ADC 350/processing circuitry 360. The PCCL 400 may cause the ADC 350 to sample the cycle-by-cycle averaged signal (410).

In various implementations, multiple hourglass integrators may be multiplexed to the ADC 350. For example, two hourglass integrators may be interleaved and coupled to the ADC 350 such that a first of the two hourglass integrators may be sampled by the ADC 350 while the second of the two hourglass integrators may be set to hold it output (e.g., by shorting its differential input lines) such that the instantaneous signal into the hourglass integrator during the hold is zero. Integrating over zero leaves the integrated total unchanged.

The PCCL 400 may use, e.g., at the processing circuitry 360, the sampled signal from the ADC 350 to generate a correction signal for provision to the signal combiner 320 (412). In various implementations, the processing circuitry 360 may be implemented as a field programmable gating array (FPGA). However, other processing circuitry configurations may be used. For example, a microcontroller circuit, a processor running software to control a digital-to-analog converter (DAC), and/or other signal processing configurations may be used.

The PCCL 400 may, at the signal combiner 320, combine the correction signal with the command signal (404).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Example Implementations

The illustrative example implementations are illustrative of the general architectures and techniques described above. Descriptions are included to clarify the relationship of various particular features to the specific illustrative scenario/scenarios in which the particular feature is discussed. Such a relationship to the same degree may not apply without express description of such a relationship to other implementations. Nevertheless, the various features described with respect to the individual example implementations may be readily integrated with other implementations with or without various other features present in the respective example implementation.

Figure 5:
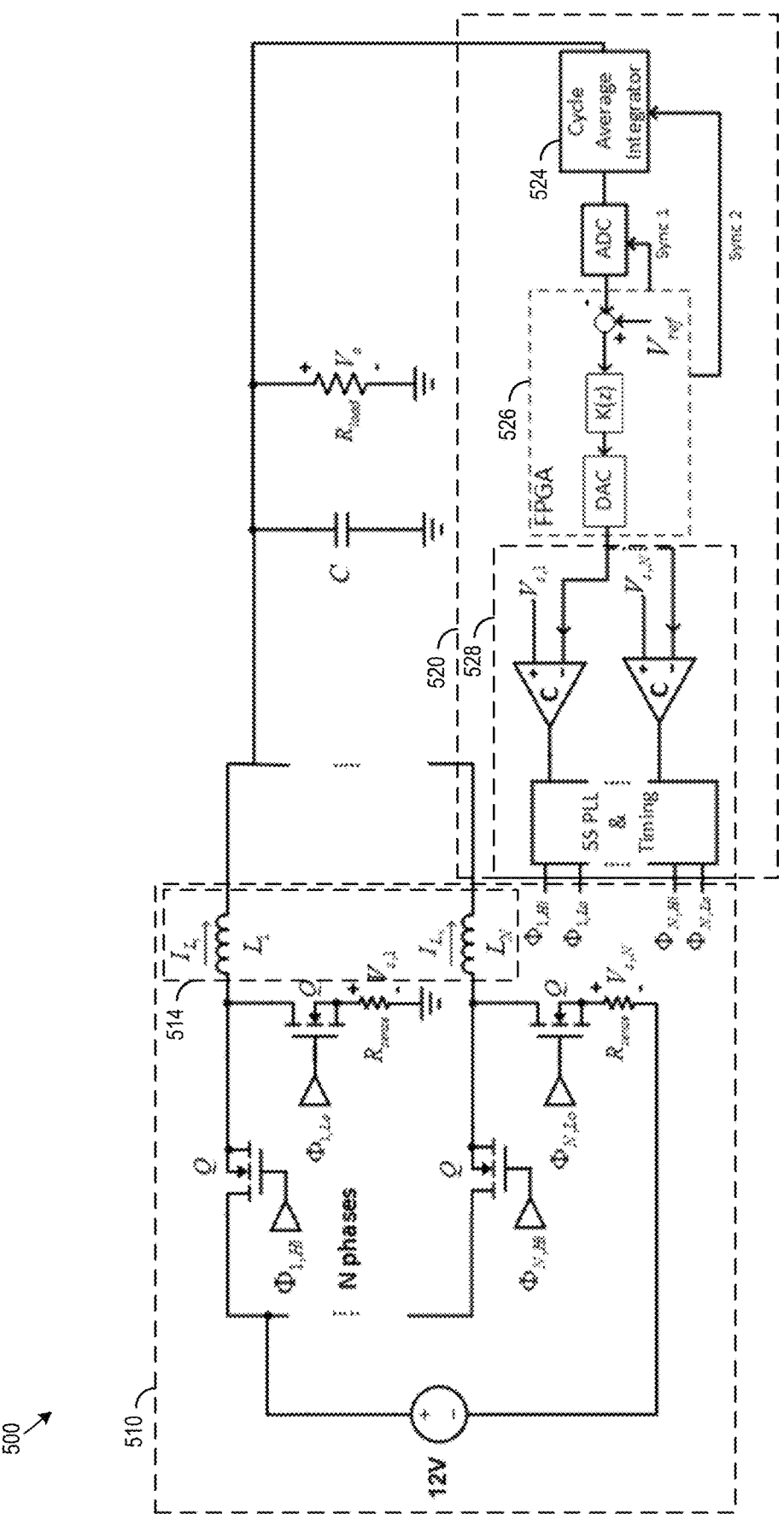
FIG. 5 shows an illustrative example power converter device.

FIG. 5 shows an illustrative example power converter device 500. The illustrative example power converter device 500 includes power converter circuitry 510 including multiple inductors 514 that receive switching signals from control circuitry 520. The control circuitry 520 may include, a cycle-by-cycle integrator 524 (such as an hourglass integrator), an FPGA 526 for processing of the integrator 524 output, and additional signal control circuitry 528 for delay timing to the individual ones of the including multiple inductors 514. In the illustrative example power converter device 500, the additional signal control circuitry 528 may include a phase-locked loop 538 to implement the timing signal and delay control.

Figure 6:
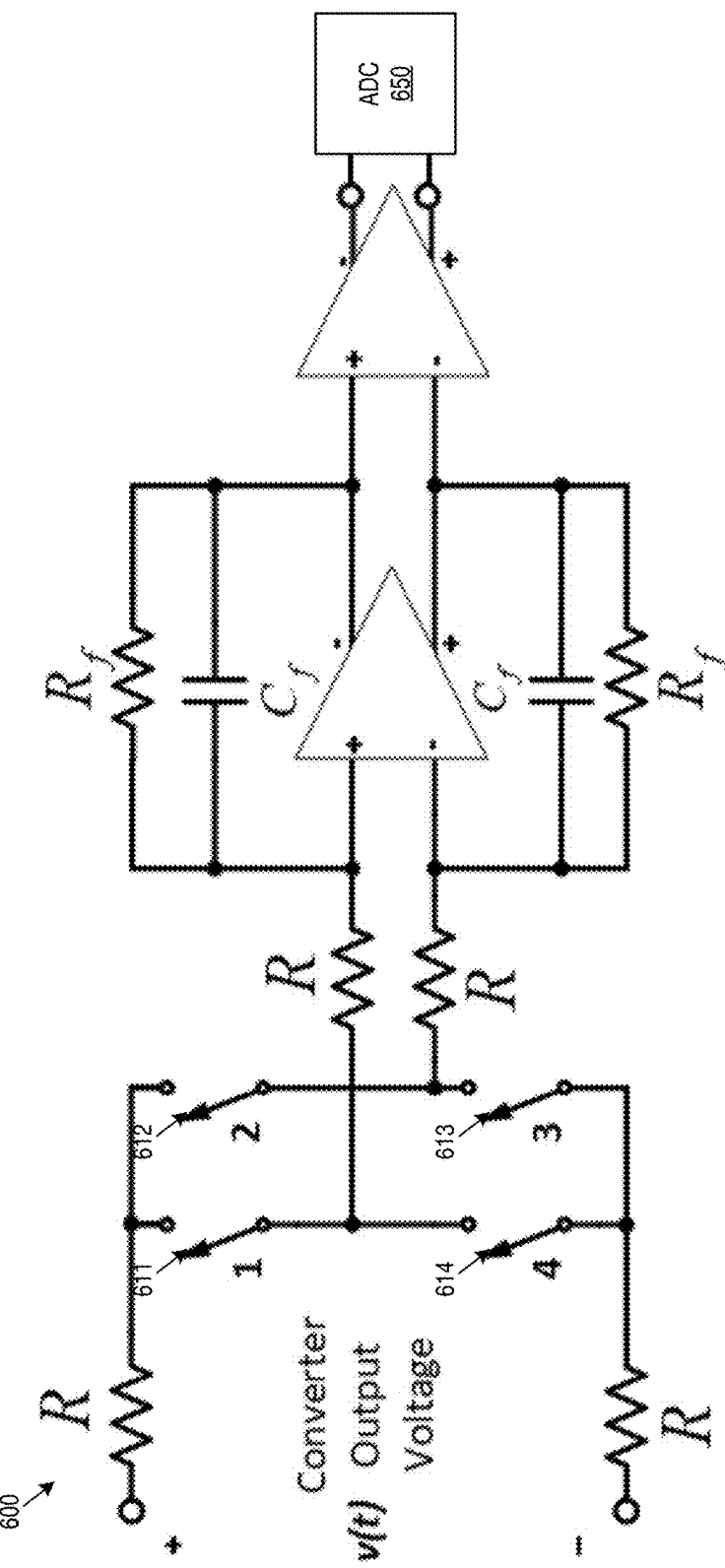
FIG. 6 shows illustrative example hourglass integrator circuitry.

FIG. 6 shows illustrative example hourglass integrator circuitry 600. The example hourglass integrator circuitry 600. The integrator modes may be selected among using the switches 611, 612, 613, 614. The switches may switch in pairs such that may hold its output up integrate and down integrate. The first pair of switches 611, 613 may switch closed (or open) together, while the second pair of switches 612, 614 may similarly switch closed (or open) together. The first pair of switches 611, 613 may be closed for up-integration while the second pair of switches 612, 614 are open. Conversely, The first pair of switches 611, 613 may be open for down-integration while the second pair of switches 612, 614 are closed. During a hold, all four switches may be closed to short the integrator input and cause the integrator to integrate zero input (e.g., remain unchanged) during this hold. Although not shown, two integrators may be interleaved (or otherwise multiplexed) to the same ADC 650 such that one integrator may hold its output while the other is sampled by the ADC 650. This multi-integrator operation may allow for continuous operation without resets by the integrator.

Various implementations have been described other implementations are possible. Table 1 includes various examples.

TABLE 1

Examples

1. A power converter device including:
power converter circuitry configured to convert an input voltage and current to an output
    voltage and current at a variable frequency, the power converter circuitry including multiple
    inductors; and
control circuitry configured to provide cycle-by-cycle control of the output voltage and current
    at the variable frequency for the power converter circuitry by:
        synchronizing valley current occurrences among the multiple inductors using phase-
        to-phase current timing control of inductor currents.

TABLE 1-continued

Examples

2.  The power converter device of example 1 or any other example in this table, where the control circuitry is configured to control the variable frequency by selecting a switching frequency for a first inductor of the multiple inductors.

3.  The power converter device of example 2 or any other example in this table, where the control circuitry is configured to synchronize the valley current occurrences among the multiple inductors by synchronizing switching of the multiple inductors based on valley current occurrences of the first inductor.

4.  The power converter device of example 3 or any other example in this table, where the control circuitry is configured to synchronize switching of the multiple inductors based on valley current occurrences of the first inductor by causing the multiple inductors to switch in sequence from the first inductor to a last inductor.

5.  The power converter device of example 3 or any other example in this table, where the control circuitry is configured to synchronize switching of the multiple inductors based on valley current occurrences of the first inductor by implementing an individual switching timing delay relative to the valley current occurrences of the first inductor for each of the other ones of the multiple inductors.

6.  The power converter device of example 2 or any other example in this table, where the control circuitry is configured to cause the multiple inductors to reach a steady state frequency based on the switching frequency of a first inductor after a transient frequency period.

7.  The power converter device of example 6 or any other example in this table, where the control circuitry is configured to control a duration of the transient frequency period by controlling a ramp-up time for current output for at least the first inductor.

8.  The power converter device of example 1 or any other example in this table, where at least some of the multiple inductors, at least in part, share current flux.

9.  The power converter device of example 1 or any other example in this table, where at least some of the multiple inductors are coupled to one another.

10.  A method including:
converting an input voltage and current to an output voltage and current at a variable frequency using multiple inductors; and
synchronizing valley current occurrences among the multiple inductors using phase-to-phase current timing control of inductor currents to perform cycle-by-cycle control of the output voltage and current for the multiple inductors.

11.  The method of example 10 or any other example in this table, further including controlling the variable frequency by selecting a switching frequency for a first inductor of the multiple inductors.

12.  The method of example 11 or any other example in this table, where synchronizing the valley current occurrences among the multiple inductors includes synchronizing switching of the multiple inductors based on valley current occurrences of the first inductor.

13.  The method of example 12 or any other example in this table, where synchronizing switching of the multiple inductors based on valley current occurrences of the first inductor includes causing the multiple inductors to switch in sequence from the first inductor to a last inductor.

14.  A power converter device including:
a power converter circuitry configured to convert an input voltage and current to an output voltage and current in accord with a switching frequency, the power converter circuitry including one or more inductors; and
control circuitry including a first hourglass integrator, the control circuitry configured to provide cycle-by-cycle control of voltage and current for the power converter circuitry by:
    obtaining sensor output for the power converter circuitry; and
    applying the first hourglass integrator to generate cycle-by-cycle averaging for the sensor output.

15.  The power converter device of example 14 or any other example in this table, where:
the control circuitry includes a second hourglass integrator; and
the first and second hourglass integrators are multiplexed to an analog-to-digital converter.

16.  The power converter device of example 15 or any other example in this table, where the second hourglass integrator is configured to hold an output at a time that analog-to-digital converter is configured to sample the first hourglass integrator.

17.  The power converter device of example 15 or any other example in this table, where the first and second hourglass integrators are configured to operate in a continuous reset-free mode.

18.  The power converter device of example 14 or any other example in this table, where the control circuitry is configured to generate a correction signal based at least in part on the cycle-by-cycle averaging for the sensor output.

19.  The power converter device of example 18 or any other example in this table, where the control circuitry includes a voltage control loop configured to add the correction signal to an incoming command signal.

20.  The power converter device of example 14 or any other example in this table, where the first hourglass integrator is configured with a time constant based on a ramp time for the first hourglass integrator, the ramp time associated with a ramp from a reference voltage to a full-scale voltage.

21.  A power converter device including:
a power converter circuitry configured to convert an input voltage and current to an output voltage and current at a variable or fixed frequency, the power converter circuitry including multiple inductors; and TABLE 1-continued Examples control circuitry configured to provide cycle-by-cycle control of voltage and current for the
    power converter circuitry by:
        optionally, monitoring a cycle-by-cycle average voltage output for the power converter
            circuitry;
        optionally, monitoring a cycle-by-cycle average current output for the power converter
            circuitry; and
        optionally, balancing valley current among the multiple inductors using phase-to-phase
            current control of inductor currents.
22.    A method including implementing cycle-by-cycle control of current and voltage output
        for a power converter using cycle-by-cycle averaging of a voltage output and/or current
        sensing for individual inductors within the power converter, where
optionally, the power converter includes the power converter device of example 21.
23.    The power converter of example 21 or any other example in this table, where the
        variable or fixed frequency includes a variable frequency.
24.    The power converter of example 1, 21 or any other example in this table, where
        monitoring a cycle-by-cycle average current output includes using an hourglass integrator.
24.    The power converter of example 1, 14, 21 or any other example in this table, where
        the control circuitry includes a digital controller, where:
optionally, the digital controller includes:
        a field-programmable gating array (FPGA)
        a microprocessor;
        a microcontroller;
        programmable logic; and/or
        any other digital circuitry.
25.    A method of power converter frequency, phase, voltage, and/or current output control
        optionally including implementing any feature or combination of features in the disclosure.
26.    A device including circuitry configured to implement power converter frequency,
        phase, voltage, and/or current output control, the device optionally including any feature or
        combination of features in the disclosure.
27.    A method of cycle-by-cycle averaging for the purposes of voltage or current sensor
        output averaging using an hourglass integrator.
28.    A method of fabricating, at least in part, the device of any of the other examples in this
        table.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A power converter device including:

power converter circuitry configured to convert an input voltage and current to an output voltage and current at a variable frequency, the power converter circuitry including multiple inductors; and control circuitry configured to provide cycle-by-cycle control of the output voltage and current at the variable frequency for the power converter circuitry by:

synchronizing valley current occurrences among the multiple inductors using phase-to-phase current timing control of inductor currents, where the control circuitry is configured to control the variable frequency by selecting a switching frequency for a first inductor of the multiple inductors, where the control circuitry is configured to cause the multiple inductors to reach a steady state frequency based on the switching frequency of the first inductor after a transient frequency period, and where the control circuitry is configured to control a duration of the transient frequency period by controlling a ramp-up time for current output for at least the first inductor.

2. The power converter device of claim 1, where the control circuitry is configured to synchronize the valley current occurrences among the multiple inductors by syn-chronizing switching of the multiple inductors based on valley current occurrences of the first inductor.

3. The power converter device of claim 2, where the control circuitry is configured to synchronize switching of the multiple inductors based on the valley current occurrences of the first inductor by causing the multiple inductors to switch in sequence from the first inductor to a last inductor.

4. The power converter device of claim 2, where the control circuitry is configured to synchronize switching of the multiple inductors based on the valley current occurrences of the first inductor by implementing an individual switching timing delay relative to the valley current occurrences of the first inductor for each of the other ones of the multiple inductors.

5. The power converter device of claim 1, where at least some of the multiple inductors, at least in part, share current flux.

6. The power converter device of claim 1, where at least some of the multiple inductors are coupled to one another.

7. A method including:

converting an input voltage and current to an output voltage and current at a variable frequency using multiple inductors;

synchronizing valley current occurrences among the multiple inductors using phase-to-phase current timing control of inductor currents to perform cycle-by-cycle control of the output voltage and current for the multiple inductors;

controlling the variable frequency by selecting a switching frequency for a first inductor of the multiple inductors;

causing the multiple inductors to reach a steady state frequency based on the switching frequency of the first inductor after a transient frequency period; and controlling a duration of the transient frequency period by controlling a ramp-up time for current output for at least the first inductor.

8. The method of claim 7, where synchronizing the valley current occurrences among the multiple inductors includes synchronizing switching of the multiple inductors based on valley current occurrences of the first inductor.

9. The method of claim 8, where synchronizing switching of the multiple inductors based on valley current occurrences of the first inductor includes causing the multiple inductors to switch in sequence from the first inductor to a last inductor.

10. A device including:

means for converting an input voltage and current to an output voltage and current at a variable frequency using multiple inductors;

means for synchronizing valley current occurrences among the multiple inductors using phase-to-phase current timing control of inductor currents to perform cycle-by-cycle control of the output voltage and current for the multiple inductors;

means for controlling the variable frequency by selecting a switching frequency for a first inductor of the multiple inductors;

means for causing the multiple inductors to reach a steady state frequency based on the switching frequency of the first inductor after a transient frequency period; and means for controlling a duration of the transient frequency period by controlling a ramp-up time for current output for at least the first inductor.

11. The device of claim 10, further including:

means for generating a correction signal based at least in part on the cycle-by-cycle control for the sensor output.

12. The device of claim 11, further including:

means for providing a voltage control loop configured to add the correction signal to an incoming command signal.

13. The device of claim 12, further including:

means for synchronizing switching of the multiple inductors based on the valley current occurrences of the first inductor by implementing an individual switching timing delay relative to the valley current occurrences of the first inductor for each of the other ones of the multiple inductors.

14. The device of claim 10, further including:

means for synchronizing the valley current occurrences among the multiple inductors by synchronizing switching of the multiple inductors based on valley current occurrences of the first inductor.

15. The device of claim 14, further including:

means for synchronizing switching of the multiple inductors based on the valley current occurrences of the first inductor by causing the multiple inductors to switch in sequence from the first inductor to a last inductor.

* * * * *